United States Patent
Van Elburg et al.

(10) Patent No.: US 8,654,770 B2
(45) Date of Patent: Feb. 18, 2014

(54) METHOD OF SETTING UP A CALL IN AN INTERNET PROTOCOL MULTIMEDIA SUBSYSTEM NETWORK

(75) Inventors: Hans-Erik Van Elburg, Oosterhout (NL); Germán Blanco, Paracuellos del Jarama (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1356 days.

(21) Appl. No.: 12/414,168

(22) Filed: Mar. 30, 2009

(65) Prior Publication Data
US 2009/0252157 A1   Oct. 8, 2009

(30) Foreign Application Priority Data
Mar. 28, 2008 (EP) .................. 08005965

(51) Int. Cl.
*H04L 12/56* (2011.01)
(52) U.S. Cl.
USPC .................. 370/392; 370/352; 455/432.5
(58) Field of Classification Search
USPC .......... 370/230, 230.1, 231, 235, 352–356, 370/389, 392, 395.3, 395.31–395.32, 370/428–429; 455/414.1, 435.1–435.3
See application file for complete search history.

(56) References Cited

U.S. PATENT DOCUMENTS

| | | | | |
|---|---|---|---|---|
| 7,990,960 B2 * | 8/2011 | Bakker et al. | ................. | 370/389 |
| 8,462,637 B1 * | 6/2013 | Baldwin et al. | ............... | 370/237 |
| 2004/0246965 A1 * | 12/2004 | Westman et al. | ............. | 370/392 |
| 2006/0035637 A1 * | 2/2006 | Westman | ................... | 455/435.3 |
| 2006/0120362 A1 * | 6/2006 | Westman et al. | ............. | 370/389 |
| 2007/0121622 A1 * | 5/2007 | Zhu et al. | ....................... | 370/389 |
| 2008/0032695 A1 * | 2/2008 | Zhu et al. | ....................... | 455/442 |
| 2008/0240083 A1 * | 10/2008 | Feldman et al. | .............. | 370/352 |
| 2009/0041010 A1 * | 2/2009 | Bakker et al. | ................. | 370/352 |
| 2009/0215453 A1 * | 8/2009 | Blanco Blanco et al. | .. | 455/435.1 |
| 2009/0227236 A1 * | 9/2009 | Sanchez Herrero et al. | ......................... | 455/414.1 |
| 2011/0314169 A1 * | 12/2011 | Van Elburg et al. | .......... | 709/228 |
| 2012/0011273 A1 * | 1/2012 | Van Elburg et al. | .......... | 709/238 |

OTHER PUBLICATIONS

3GPP, 3rd Generation Partnership Project, Technical Specification Group Core Network and Terminals, Numbering. Addressing and Identification (Release 8). 3GPP TS 23.003 v8.0.0 Mar. 25, 2008.

* cited by examiner

*Primary Examiner* — Kevin Mew

(57) ABSTRACT

The present invention is directed to a method of setting up a call from an originating user in an internet protocol (IP) multimedia subsystem (IMS) network. The originating user provides a signalling message containing an originating identifier of the user to a first node of the network. According to the method, a first node of the network receives the signalling message. The first node performs a verification on whether the originating identifier is associated with a wildcard identifier, wherein the wildcard identifier identifies a plurality of identifiers which are entitled to using a group service. If the originating identifier is associated with a wildcard identifier, the first node forwards the wildcard identifier and the originating identifier to a further node for setting up the call.

15 Claims, 4 Drawing Sheets

METHOD OF SETTING UP A CALL IN AN INTERNET PROTOCOL MULTIMEDIA SUBSYSTEM NETWORK

This application claims the benefit of European patent application number 08005965.2 filed on Mar. 28, 2008, the disclosure of which is fully incorporated herein by reference.

TECHNICAL FIELD

The present invention relates generally to a method of setting up a call in an internet protocol (IP) multimedia subsystem network (IMS), and in particular to a method of setting up a call from an originating user in an internet protocol (IP) multimedia subsystem (IMS) network, said originating user providing a signalling message containing an originating identifier of said user to said first node of said network, said method comprising the steps of: a first node of said network receiving said signalling message.

The invention is further directed to a method of operating a network node, a network node, a telecommunications service provider using the method as defined above, a computer program and a computer readable medium.

BACKGROUND

Wildcarded public user identities (WIMPU's) are added to the $3^{rd}$ generation partnership project (3GPP) internet protocol (IP) multimedia subsystem (IMS) standards in 3GPP release 8. Wildcarded public user identities are used to enable routing traffic to a destination that in fact is responsible for a range of end user addresses, like for example an internet protocol private branch exchange (IP-PBX). A wildcarded public user identity is implicitly registered when such an entity registers.

All public user identities (IMPU's) that match an implicitly registered wildcard, are handled according to the same service profile that is associated with that wildcard. For originating traffic that means the nodes involved in setting up the call, such as a proxy call session control function (P-CSCF) or a serving call session control function (S-CSCF), need to match the P-Preferred-Identity/P-Asserted-Identity received in for example a session initiation protocol (SIP) INVITE message with all the wildcarded IMPU's known in these nodes. If multiple nodes are involved this requires an extensive amount of processing to be performed by these nodes.

SUMMARY

It is an object of the present invention to overcome the above-mentioned problems, and to improve signalling efficiency during call setup of a call in an internet protocol (IP) multimedia subsystem (IMS) network.

The above-mentioned object is achieved by the present invention in that there is provided, according to a first aspect, a method of setting up a call from an originating user in an internet protocol (IP) multimedia subsystem (IMS) network. The originating user provides a signalling message containing an originating identifier of the user to a first node of the network. According to the method, a first node of the network receives the signalling message. The first node performs a verification on whether the originating identifier is associated with a wildcard identifier, wherein the wildcard identifier identifies a plurality of identifiers which are entitled to using a group service. If the originating identifier is associated with a wildcard identifier, the first node forwards the wildcard identifier and the originating identifier to a further node for setting up the call.

The first node involved in setting up the call through the IMS network, performs a match on the originating identifier, e.g. the P-Preferred-Identity in the SIP INVITE message, in order to match the originating identifier with a wildcarded identifier associated with that originating identifier. By forwarding the result of the match, i.e. the originating identifier and the wildcarded identifier, to the further nodes in setting up the call, the requirement of said further nodes involved in setting up the call in order to perform a match on the originating identifier for identifying the wildcarded identifier, is eliminated. This modification in the signalling process significantly improves the overall efficiency of the signalling during call setup when wildcarded identifiers are used.

The wildcarded identifier and the originating identifier may be forwarded together in a single signalling message, or separately from each other. In the latter case, it is important that the further node is capable of relating the wildcarded identifier with the originating identifier from the signalling data received from the first node.

The signalling message may be selected from a group comprising a session initiation protocol INVITE (SIP INVITE) message, a location information request (LIR) or answer (LIA) message, a server assignment request (SAR) or answer (SAA) message or the like. Since these messages are frequently exchanged between nodes involved in call setup over an IMS network, the originating identifier and the wildcarded identifier may be provided using these signalling messages, without the need for having to send an additional signalling message through the network.

The method of the present invention may be implemented using any network node which is involved in call setup over the IMS network as the first node of the network, however in particular, the first node and/or the further node is an element of a group comprising a proxy call session control function (P-CSCF), an initiation call session control function (I-CSCF), a serving call session control function (S-CSCF), an application server (AS), or a home subscriber server (HSS). Any of these nodes are frequently used in call setup through an IMS network and are actively involved in the signalling.

Verification may be performed either by performing a match of the originating identity with a plurality of wildcarded identities, or alternatively, the required information is already provided in an incoming signalling message and the first node simply has to verify the incoming signalling message for the availability of the wildcard identifier and/or the originating identifier. In combination, it may first be checked whether the information is contained in the received signalling message by the first node, and if this is not the case, a match may be performed by the first node in order to identify a possible wildcard identity, prior to forwarding this information to the further node.

In a second aspect of the invention, there is provided a method of operating a network node for setting up a call from an originating user in an internet protocol (IP) multimedia subsystem (IMS) network. According to this method of operating the node, the network node receives a signalling message provided by the originating user and containing an originating identifier of the user. The network node performs a verification on whether the originating identifier is associated with a wildcard identifier, wherein the wildcard identifier identifies a plurality of identifiers which are entitled to using a group service. If the originating identifier is associated with a wildcard identifier, the network node forwards the wildcard identifier together with the originating identifier to a further node for setting up the call.

According to a third aspect of the present invention there is provided a network node for an internet protocol (IP) multimedia subsystem (IMS) network. The network node is arranged for setting up a call from an originating user, and comprises a communication unit comprising an input unit for receiving a signalling message provided by the originating user and containing an originating identifier of the user. The network node further comprises a processing unit for performing a verification on whether the originating identifier is associated with a wildcard identifier, wherein the wildcard identifier identifies a plurality of identifiers which are entitled to using a group service in the internet protocol (IP) multimedia subsystem (IMS) network. The communications unit further comprises an output unit for forwarding the wildcard identifier together with the originating identifier to a further node for setting up the call, if the originating identifier is associated with a wildcard identifier.

In accordance with a fourth aspect of the present invention there is provided a telecommunications service provided using a method as described above.

In accordance with a fifth aspect, there is provided a computer program loadable into a processing unit of a network node, the computer program comprising portions of software code adapted to perform the steps of a method according to either one of the first or second aspects of the invention.

In accordance with a sixth aspect, there is provided a computer-readable medium product comprising a computer program according to the fifth aspect described hereinabove.

BRIEF DESCRIPTION OF THE DRAWINGS

Hereinbelow, the invention is further illustrated by means of some embodiments thereof, with reference to the enclosed drawings, wherein.

DETAILED DESCRIPTION

Figure 1:
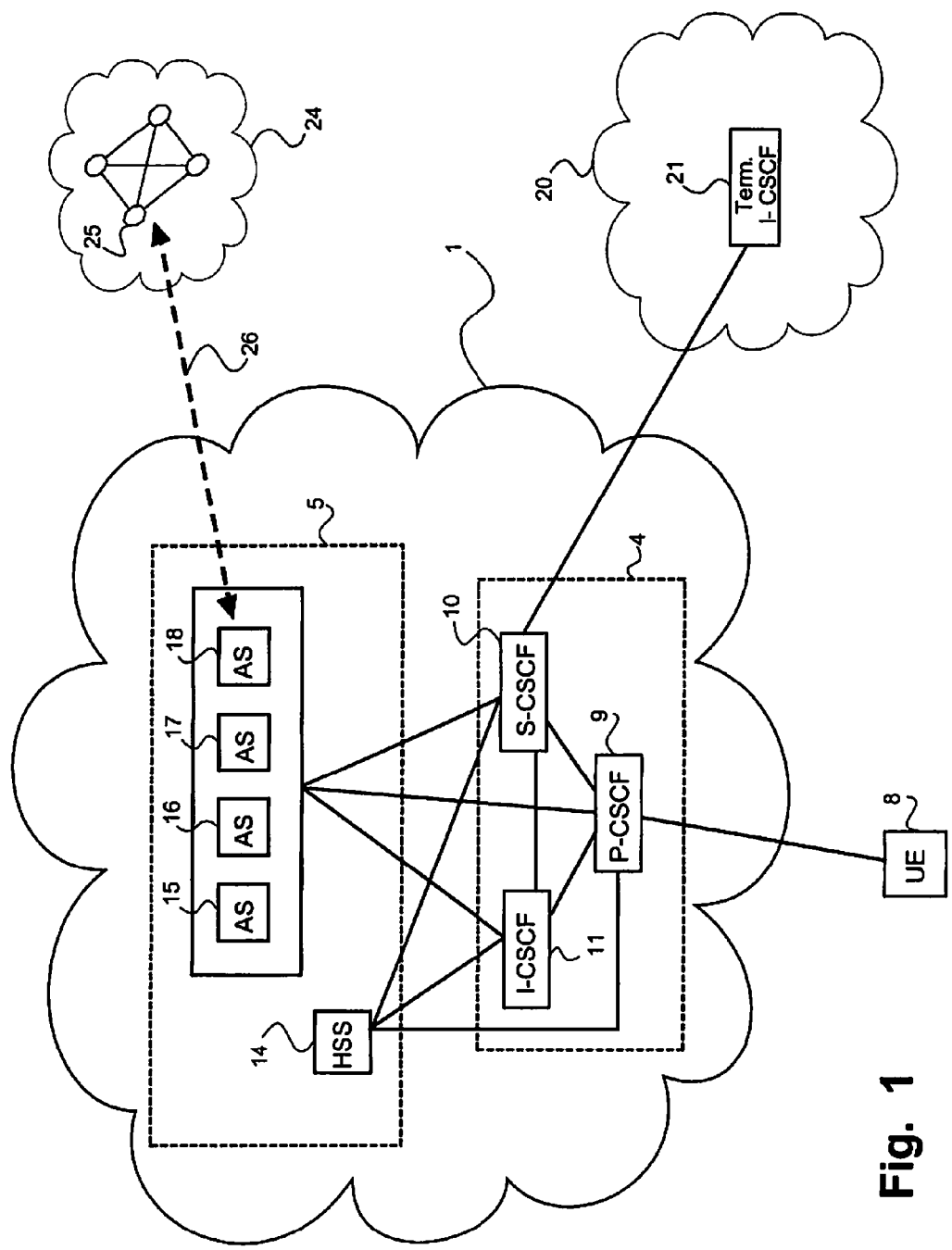
FIG. 1 illustrates an IMS network wherein the invention is implemented.

FIG. 1 illustrates schematically an internet protocol (IP) multimedia subsystem (IMS) network 1 comprising an IMS core network 4 and a service layer 5. The IMS core network 4 comprises the proxy call session control function 9 responsible, amongst others, for authenticating incoming originating calls from user equipment (UE) units, such as user equipment unit 8. Switching and routing of incoming calls is usually performed by the serving call session control function (S-CSCF) 10 in the IMS core network 4. The S-CSCF 10 is also responsible for applying the correct service profile of the users involved in a call. Service profiles are stored in the home subscriber server (HSS) 14 and can be accessed by the S-CSCF 10 from there.

Value added services may be provided using application servers 15, 16, 17 or 18 in the application layer 5 of the IMS network 1. The IMS network 1 further comprises an interrogating call session control function (I-CSCF) 11 in the IMS core layer 4. The I-CSCF 11 functions as a gateway or entry point for servers and nodes which are located outside the domain of IMS network 1. It, for example, makes sure that incoming calls are assigned a suitable S-CSCF in the IMS network 1, by querying the HSS 14. An incoming call from a different domain or different network, e.g. circuit switched telecommunications network 24 in FIG. 1, may enter the IMS network domain 1 through an application server 18, as indicated by the dotted arrow 26 between application server 18 and one of the nodes 25 of circuit switched network 24. From there the signalling is usually forwarded to the I-CSCF 11.

Further in FIG. 1, there is illustrated a terminating I-CSCF 21 located in an external IMS network domain 20. In the examples provided hereinbelow, it is assumed that a call is to be set up to a user in the external IMS network domain 20, i.e. through terminating I-CSCF 21.

Figure 2:
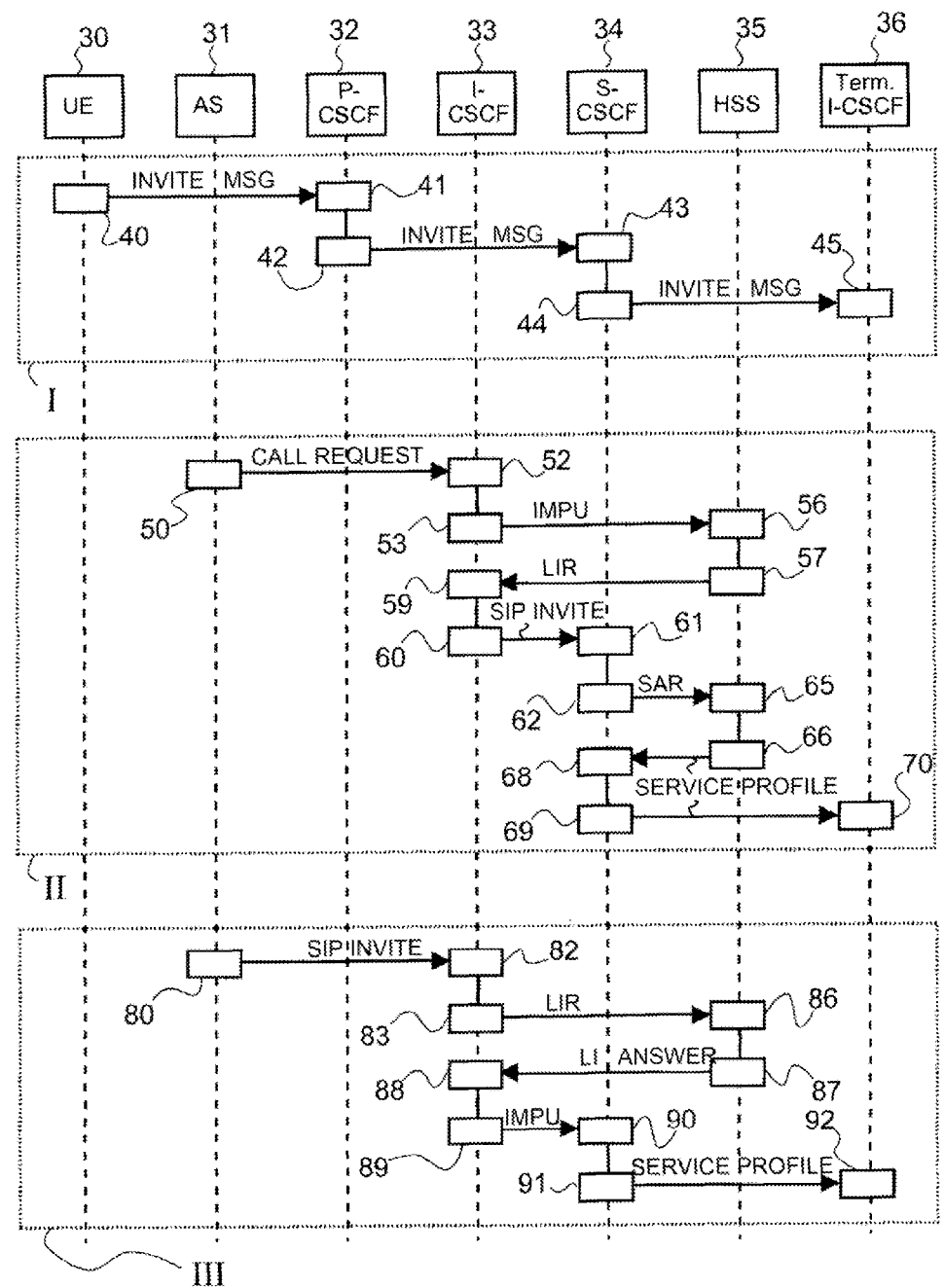
FIG. 2 illustrates various embodiments of the methods of the present invention.

FIG. 2 schematically illustrates some examples of the methods of the present invention. In particular, three alternative embodiments I, II and III are illustrated in FIG. 2. FIG. 2 schematically illustrates in columns the method step performed by each node involved in setting up the call for each alternative. All the method steps illustrated in a same column, are performed by the network node schematically indicated at the top of the column.

The units indicated have been given new reference numerals in FIG. 2, however, they may be any of the corresponding units illustrated in FIG. 1 hereinabove. Respectively, the columns illustrate method steps to be performed by user equipment (UE) unit 30, application server (AS) 31, proxy call session control function (P-CSCF) 32, interrogating call session control function (I-CSCF) 33, serving call session control function (S-CSCF) 34, home subscriber server (HSS) 35 and terminating interrogating call session control function (term. I-CSCF) 36.

In the first described alternative I, call setup is illustrated wherein the originating calling party is a user equipment (UE) unit 30 which is registered in the present IMS domain. Call setup is initiated by UE 30 by sending a session initiation protocol (SIP) INVITE message to P-CSCF 32. The SIP INVITE message contains a parameter P-Preferred-Identity (PPI) parameter specifying the preferred specific public user identity (IMPU) that the UE 30 wants to use. P-CSCF 32 performs in step 41 authentication for the use of the indicated P-Preferred-Identity in order to determine whether UE 30 is allowed to use the specific IMPU indicated. In addition the specific IMPU is matched with all wildcarded IMPU's known to the P-CSCF, in order to determine whether the specific IMPU is associated with a wildcarded IMPU. For the present example, the P-CSCF 32 finds a match with a certain wildcarded IMPU for the indicated preferred specific IMPU. In step 42, the SIP INVITE message is forwarded to a serving call session control function (S-CSCF) 34. P-CSCF 32 includes both the P-Preferred-Identity (PPI) and the wildcarded IMPU in the SIP INVITE message before forwarding this message in step 42.

The SIP INVITE message is received in step 43 by S-CSCF 34. Without having to redo the matching process of the asserted specific IMPU (i.e. the P-Asserted-Identity (PAI)) with the wildcarded IMPU in order to associate the specific IMPU with the wildcard IMPU, the S-CSCF 34 may simply apply the service profile associated with the wildcarded IMPU to this specific originating call (step 44), and forward the SIP INVITE message to the terminating interrogating call session control function (terminating I-CSCF) 36 in the external IMS domain, for further processing of the call setup.

Forwarding the wildcarded IMPU together with the asserted specific IMPU in step 42 obviates the necessity for the S-CSCF 34 to perform a time consuming match of the specific IMPU indicated with any wildcarded IMPU in order to identify a required service profile for the call. This greatly improves efficiency of the signalling process.

In alternative II a call is set up on behalf of an originating user which is not registered in the present IMS domain. The incoming call request is received in the IMS domain through application server 31 in step 50. In the call request forwarded by the application server 31 to the interrogating call session control function (I-CSCF) 33, it is indicated that the call is to be set up on behalf of a specific IMPU. The specific IMPU is forwarded in step 53 to a home subscriber server 35 where it is received in step 56. In step 57, the HSS 35 matches the specific IMPU with all wildcarded IMPU's in order to find an associated wildcarded IMPU if available. Assuming that a specific IMPU can be matched with a wildcard IMPU, in step 57 the HSS 35 forwards a location information answer (LIA) back to I-CSCF 33, which LIA contains the wildcarded IMPU and the network address of S-CSCF 34 to which the call request is to be forwarded by I-CSCF 33. In step 60, I-CSCF 33 forwards a SIP INVITE message to S-CSCF 34 which contains the specific IMPU and the wildcard IMPU which is associated therewith. This SIP INVITE message is received in step 61 by S-CSCF 34. A server assignment request (SAR) is sent to HSS 35 by S-CSCF 34 in step 62, which SAR contains both the specific IMPU and the wildcard IMPU associated therewith. The service profile is taken from the HSS 35 based on the received wildcard IMPU and sent back to the S-CSCF 34 in step 66. It is received by the S-CSCF 34 in step 68, and in step 69 call setup is continued by forwarding the request with the correct service profile to the terminating I-CSCF 36.

In the above described example II, the necessity to match the specific IMPU with the wildcarded IMPU's is obviated to a great extent, and instead of performing such a match three times during the call setup the match is performed only once in step 56.

Alternative III is a further embodiment of the present invention, suitable for setting up a call on behalf of an originating user which is registered in the present IMS domain. Different to alternative I, in alternative III the registered user that wants to set up the call has roamed to an other IMS domain, and the originating call setup request is received through application server 31 in step 80. The originating call request is forwarded in step 80 in a SIP INVITE message to interrogating call session control function (I-CSCF) 33, where it is received in step 82. I-CSCF 33 sends a location information request (LIR) in step 83 to home subscriber server (HSS) 35, where it is received in step 86. In step 86, HSS 35 performs a match in order to associate the specific IMPU with a wildcarded IMPU, and for the present example such a match is found. In step 87, a location information answer is returned to the I-CSCF 33, indicating the network address of S-CSCF 34 for handling the call, and additionally including the wildcarded IMPU found by HSS 35. In step 88, the LIA is received by the I-CSCF, and the wildcarded IMPU is forwarded in step 89, together with the specific IMPU, to S-CSCF 34 indicated in the LIA received from HSS 35. The S-CSCF 34 finds the service profile to be used with this wildcarded IMPU, and forwards the request to the terminating I-CSCF for further processing of the call setup.

Instead of forwarding both the specific IMPU and associated wildcarded IMPU in a single signalling message, this information may be sent in different messages, that may be associated with each other.

If no wildcarded IMPU is found, this may as well be indicated in the signalling message. The receiving node may, dependent on the situation, then opt to either redo the matching with a larger set of wildcarded IMPU's, or may decide that the specific IMPU cannot be matched with a wildcard.

Figure 3:
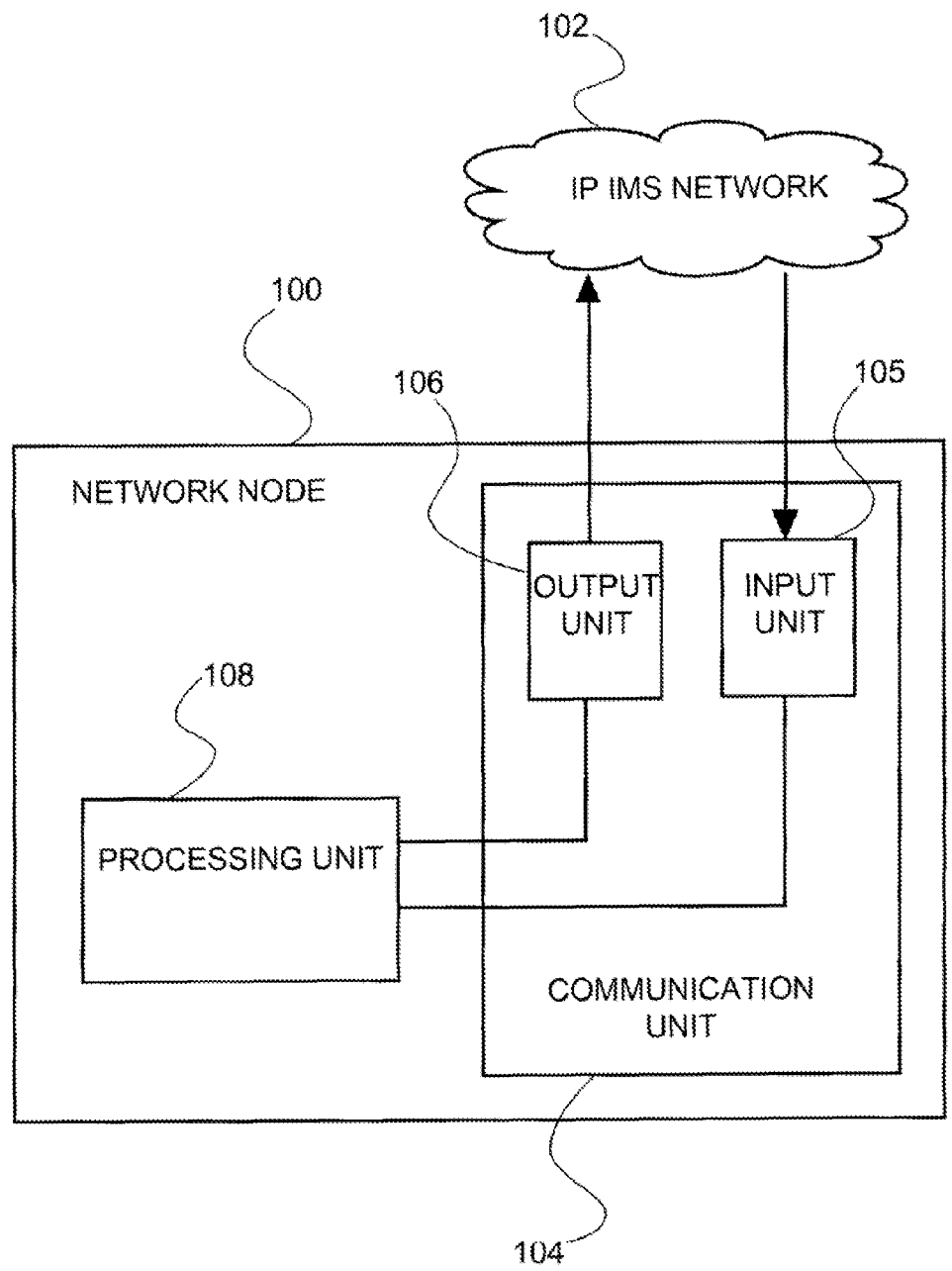
FIG. 3 illustrates a network node in accordance with the present invention.

FIG. 3 illustrates a network node 100, in accordance with the invention, for an internet protocol (IP) multimedia subsystem (IMS) network 102. The network node 100 is arranged for setting up a call from an originating user, and comprises a communication unit 104 comprising an input unit 105 for receiving a signalling message provided by the originating user and containing an originating identifier of the user. The network node 100 further comprises a processing unit 108 for performing a verification on whether the originating identifier is associated with a wildcard identifier, wherein the wildcard identifier identifies a plurality of identifiers which are entitled to using a group service in the internet protocol (IP) multimedia subsystem (IMS) network 102. The communications unit 104 further comprises an output unit 106 for forwarding the wildcard identifier together with the originating identifier to a further node for setting up the call, if the originating identifier is associated with a wildcard identifier.

Figure 4:
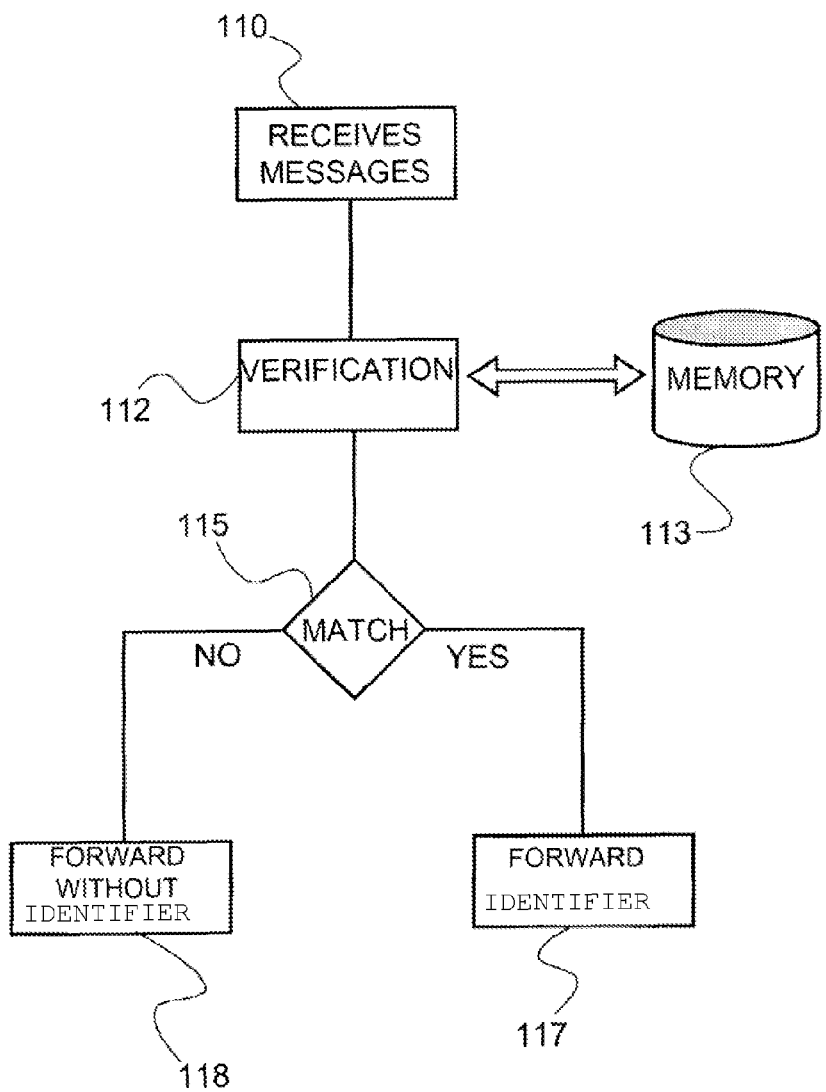
FIG. 4 illustrates a method of operating a network node in accordance with the present invention.

FIG. 4 illustrates a method of operating a network node for setting up a call from an originating user in an internet protocol (IP) multimedia subsystem (IMS) network. According to this method of operating the node, in step 110 the network node receives a signalling message provided by the originating user and containing an originating identifier of the user. The network node, in step 112, performs a verification on whether the originating identifier is associated with a wildcard identifier, wherein the wildcard identifier identifies a plurality of identifiers which are entitled to using a group service. Step 112 may be performed by consulting a database, memory means or other data repository 113. In step 115, the network node decides whether a match between a wildcarded IMPU and the specific IMPU are found. If the originating identifier is associated with a wildcard identifier, the method continues in step 117, and the network node forwards the wildcard identifier together with the originating identifier to a further node for setting up the call. If no match was found, the method continues in step 118, and the node may forward the signalling message to the further node without wildcarded IMPU data, or with an indication that no wildcard was found (the latter option making known to the further node that the matching action was already performed once).

The skilled person will appreciate that the present invention can be implemented differently than as specifically described herein, remaining within the scope of the appending claim.

The invention claimed is:

1. A method of setting up a call from an originating user in an internet protocol multimedia subsystem network, said originating user providing a signaling message containing an originating identifier of said user to a first node of said network, said method comprising the steps of:

a first node of said network receiving said signaling message;

said first node performing a verification on whether said originating identifier is associated with a wildcard identifier, wherein said wildcard identifier identifies a plurality of identifiers which are entitled to using a group service; and if said originating identifier is associated with a wildcard identifier, said first node forwarding said wildcard identifier and said originating identifier to a further node for setting up said call.

2. The method according to claim 1, wherein said wildcard identifier and said originating identifier are forwarded together.

3. The method according to claim 1, wherein said wildcard identifier and said originating identifier are forwarded by said first node in said signaling message.

4. The method according to claim 1, wherein said signaling message is at least one element of a group comprising a session initiation protocol invite message, a location information request or answer message, or a server assignment request or answer message.

5. The method according to claim 1, wherein at least one of said first node or said further node is an element of a group comprising a proxy call session control function, an interrogating call session control function, a serving call session control function, an application server, or a home subscriber server.

6. The method according to claim 1, wherein said verification is performed by matching said originating identifier with a plurality of wildcard identifiers for finding said associated wildcard identifier.

7. The method according to claim 1, wherein said step of verification is performed by checking whether said signaling message comprises a wildcard identifier.

8. The method according to claim 1, wherein said step of checking is performed prior to said step of matching.

9. A method of operating a network node for setting up a call from an originating user in an internet protocol multimedia subsystem network, comprising the steps of:
    said network node receiving a signaling message provided by said originating user and containing an originating identifier of said user;
    said network node performing a verification on whether said originating identifier is associated with a wildcard identifier, wherein said wildcard identifier identifies a plurality of identifiers which are entitled to using a group service; and
    if said originating identifier is associated with a wildcard identifier, said network node forwarding said wildcard identifier together with said originating identifier to a further node for setting up said call.

10. The method according to claim 9, wherein said network node is an element of a group comprising a proxy call session control function, an interrogating call session control function, a serving call session control function, an application server, or a home subscriber server.

11. The method according to claim 9, wherein said verification is performed by said network by matching said originating identifier with a plurality of wildcard identifiers for finding said associated wildcard identifier.

12. The method according to claim 9, wherein said verification is performed by said network node checking whether said signaling message comprises a wildcard identifier.

13. A network node for an internet protocol multimedia subsystem network, said network node being arranged for setting up a call from an originating user, said network node comprising:
    a communication unit comprising an input unit for receiving a signaling message provided by said originating user and containing an originating identifier of said user, said network node further comprising a processing unit for performing a verification on whether said originating identifier is associated with a wildcard identifier, wherein said wildcard identifier identifies a plurality of identifiers which are entitled to using a group service in said internet protocol multimedia subsystem network, said communications unit further comprising an output unit for forwarding said wildcard identifier together with said originating identifier to a further node for setting up said call, if said originating identifier is associated with a wildcard identifier.

14. The network node according to claim 13, wherein said processing unit is arranged for performing said step of verification by matching said originating identifier with a plurality of wildcard identifiers for finding said associated wildcard identifier.

15. The network node according to claim 13, further comprising a memory unit for storing a plurality of wildcard identifiers.

* * * * *